(12) United States Patent
Aponte Hernandez et al.

(10) Patent No.: US 11,142,062 B2
(45) Date of Patent: Oct. 12, 2021

(54) FUEL TANK COVER ATTACHMENT ASSEMBLY

(71) Applicant: Nissan North America, Inc., Franklin, TN (US)

(72) Inventors: Maria Teresa Aponte Hernandez, Metepec, MI (US); Toshifumi Ishibashi, Miguel Hidalgo, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 68 days.

(21) Appl. No.: 16/584,046

(22) Filed: Sep. 26, 2019

(65) Prior Publication Data

US 2021/0094412 A1  Apr. 1, 2021

(51) Int. Cl.
*B60K 15/04* (2006.01)
*B60K 15/03* (2006.01)

(52) U.S. Cl.
CPC .... *B60K 15/04* (2013.01); *B60K 2015/03453* (2013.01)

(58) Field of Classification Search
CPC .......... B60K 2015/03105; B60K 15/04; B60K 2015/03453; B60K 15/03; B60K 2015/03447; B60K 2015/03059; B60K 2015/03243; F02M 37/103; Y10T 137/7043
USPC ........... 137/565, 565.17, 315.01, 351, 899.4; 220/562
See application file for complete search history.

(56) References Cited

U.S. PATENT DOCUMENTS

| | | | | |
|---|---|---|---|---|
| 3,910,464 | A | * | 10/1975 | Schlanzky ............ F04D 29/605 222/180 |
| 4,651,701 | A | * | 3/1987 | Weaver ................ F02M 37/103 123/497 |
| 6,367,650 | B1 | | 4/2002 | Kuehnemund et al. |
| 9,599,076 | B2 | * | 3/2017 | Powell ................. F02M 37/103 |
| 9,694,673 | B2 | * | 7/2017 | Beauchaine .......... B60K 15/01 |
| 2005/0016621 | A1 | * | 1/2005 | Klein ..................... B60K 15/04 141/98 |
| 2005/0194796 | A1 | * | 9/2005 | Powell ................. F02M 37/103 292/256 |
| 2007/0062841 | A1 | * | 3/2007 | Nakamura ....... B60K 15/03177 206/562 |
| 2008/0035120 | A1 | * | 2/2008 | Sone .................... F02M 37/103 123/509 |
| 2010/0051621 | A1 | * | 3/2010 | Shimoda .......... B60K 15/03177 220/300 |

(Continued)

*Primary Examiner* — Timothy P. Kelly
*Assistant Examiner* — Stephanie A Shrieves
(74) *Attorney, Agent, or Firm* — Global IP Counselors, LLP

(57) ABSTRACT

A fuel tank cover attachment assembly includes a fuel pump cover and an attachment ring. The fuel pump cover has an attachment flange configured to overlay a surface surrounding a fuel tank opening such that with the fuel pump cover overlaying the surface, the fuel tank opening is covered. The attachment ring is dimensioned to cover the attachment flange of the fuel pump cover and attach to attachment features protruding from the surface. The attachment ring has a first flange member and a second flange member. The first flange member is fixedly attached to the attachment ring and extends upwardly therefrom. The second flange member is removably attached to the attachment ring and extending upwardly therefrom.

20 Claims, 9 Drawing Sheets

(56) References Cited

U.S. PATENT DOCUMENTS

| | | | |
|---|---|---|---|
| 2012/0187131 A1* | 7/2012 | Claucherty | B60K 15/03 |
| | | | 220/562 |
| 2018/0208051 A1* | 7/2018 | Mushiga | B60K 15/01 |
| 2019/0234357 A1* | 8/2019 | Aponte Hernandez | |
| | | | B60K 15/03 |
| 2019/0285031 A1* | 9/2019 | Fellague | F02M 37/007 |

* cited by examiner

FUEL TANK COVER ATTACHMENT ASSEMBLY

BACKGROUND

Field of the Invention

The present invention generally relates to a fuel tank cover attachment assembly. More specifically, the present invention relates to a fuel tank cover attachment assembly that fixedly attaches a fuel tank cover to a fuel tank, the fuel tank cover being attached to a fuel pump, the fuel tank cover being provided with upwardly extending flanges that protect connections to the fuel pump.

Background Information

Fuel tank covers typically are a part of or are attached to a fuel pump that extends down into a fuel tank. The fuel tank cover typically includes an electrical connector and a fuel outlet that directs fuel pumped by the fuel pump out of the fuel tank and to an engine of a vehicle.

SUMMARY

One object of the present disclosure is to provide a fuel tank and fuel tank cover with structures that protect fuel pump connection against debris and deformation resulting from an impact event.

In view of the state of the known technology, one aspect of the present disclosure is to provide a fuel tank cover attachment assembly with a fuel pump cover and an attachment ring. The fuel pump cover has an attachment flange configured to overlay a surface surrounding a fuel tank opening such that with the fuel pump cover overlaying the surface, the fuel tank opening is covered. The attachment ring is dimensioned to cover the attachment flange of the fuel pump cover and attach to attachment features protruding from the surface. The attachment ring has a first flange member and a second flange member. The first flange member is fixedly attached to the attachment ring and extends upwardly therefrom. The second flange member is removably attached to the attachment ring and extending upwardly therefrom.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
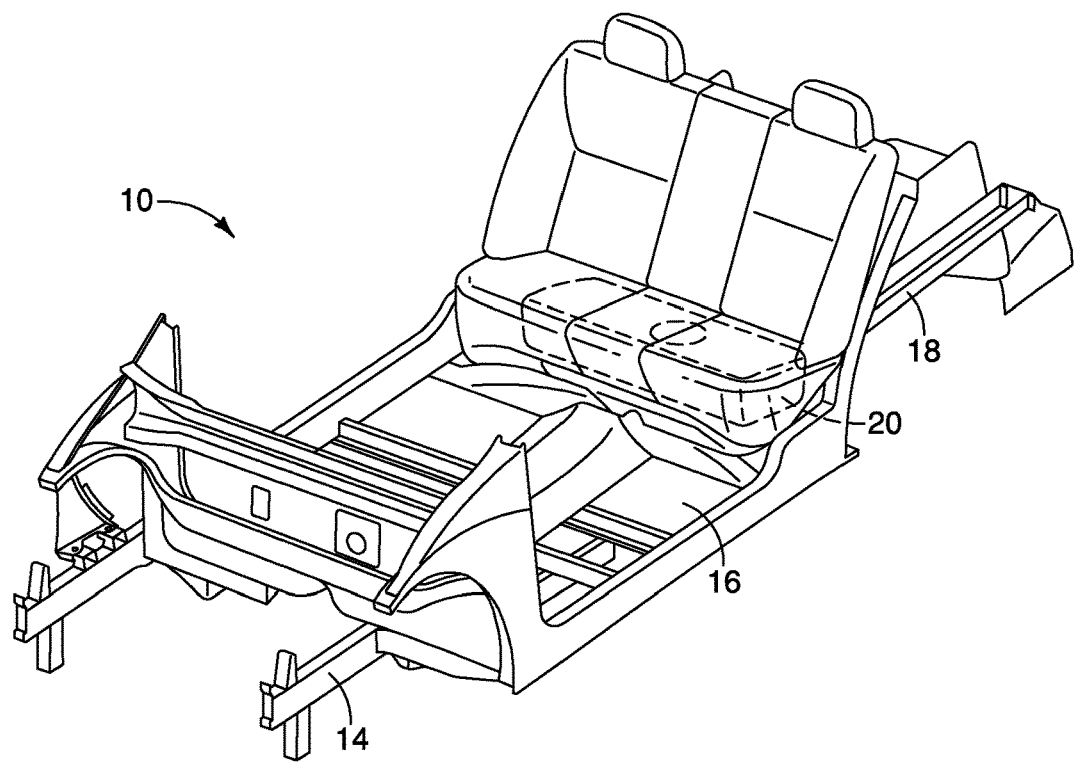
FIG. 1 is a schematic view of a vehicle body structure that includes a fuel tank assembly in accordance with one embodiment.

Referring initially to FIG. 1, a vehicle body structure 10 that includes a fuel tank cover attachment assembly 12 (FIG. 2) is illustrated in accordance with a first embodiment.

The vehicle body structure 10 includes a forward portion 14, a passenger compartment floor portion 16 and a rearward portion 18. The forward portion 14 supports an engine (not shown), steering and suspension components (not shown) and front body panels (not shown). The passenger compartment floor portion 16 supports body panels and pillar structures (not shown) that further support passenger compartment components (not shown) and roof structure components (not shown). The rearward portion 18 supports rear body panels (not shown), a rear hatch (not shown) and a fuel tank assembly 20. Since vehicle engines, steering and suspension components, body panels, pillar structures, passenger compartment components, roof structure components, rear body panels and rear hatches are conventional automotive elements and components, further description is omitted for the sake of brevity.

Figure 2:
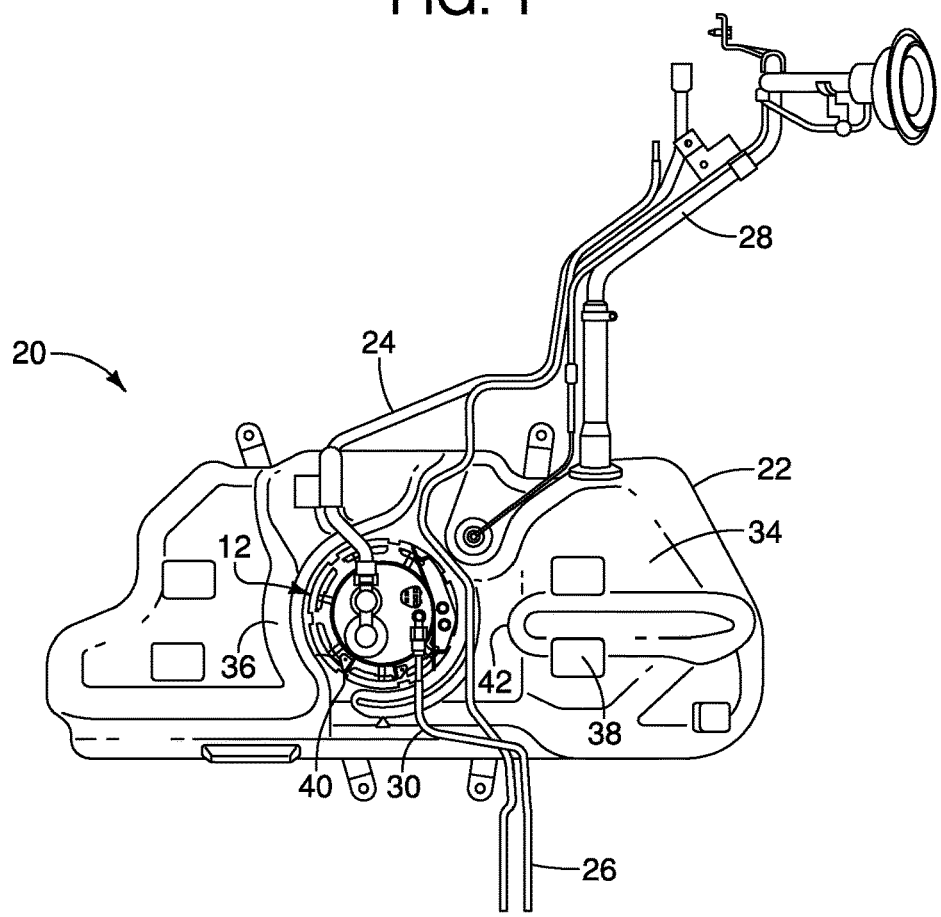
FIG. 2 is a top view of the fuel tank assembly removed from the vehicle body structure showing a fuel tank and a fuel tank cover attachment assembly in accordance with the one embodiment.

As shown in FIG. 2, the fuel tank assembly 20 includes a fuel tank 22, vent lines 24 and 26, a fuel filler tube 28, a fuel line 30 and the fuel tank cover attachment assembly 12.

The fuel tank 22 includes an opening 32 (FIG. 3) that is covered by the fuel tank cover attachment assembly 12, as is described further below. The fuel tank 22 has an upper surface 34. The upper surface 34 includes a first upwardly protruding area 36 and a second upwardly protruding area 38. The first upwardly protruding area 36 defines a first wall 40 and a second upwardly protruding area 38 defines a second wall 42. Both the first wall 40 and the second wall 42 are upright surfaces that can be inclined with respect to vertical. The opening 32 is surrounded by an annular surface 44 (hereinafter referred to as the surface 44). The surface 44 includes a plurality of attachment features 46 that protrude upward from the surface 44 and are described in greater detail below.

Figure 4:
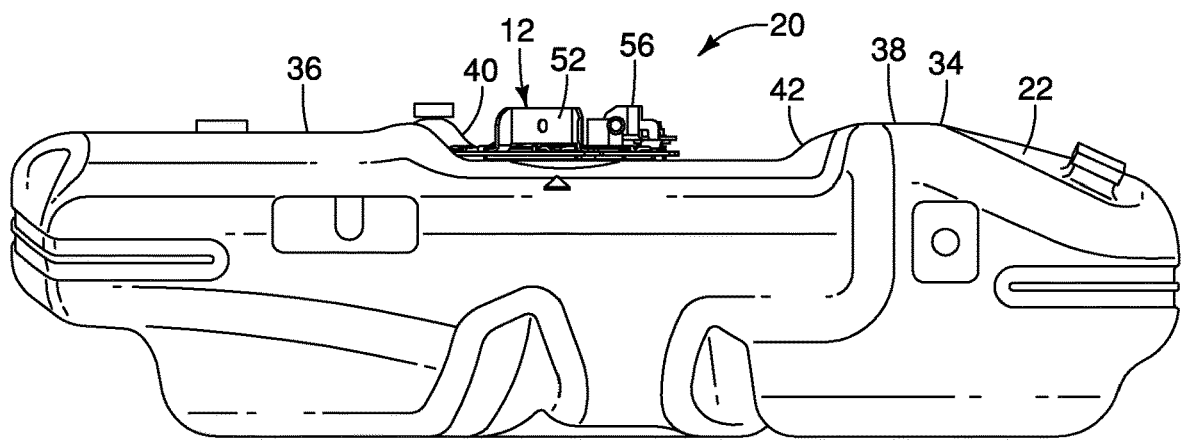
FIG. 4 is a front view of the fuel tank showing the central portion of the fuel tank and the fuel tank cover attachment assembly in accordance with the one embodiment.

The opening 32 and the fuel tank cover attachment assembly 12 are located between the first and second walls 40 and 42, as shown in FIG. 4.

Figure 3:
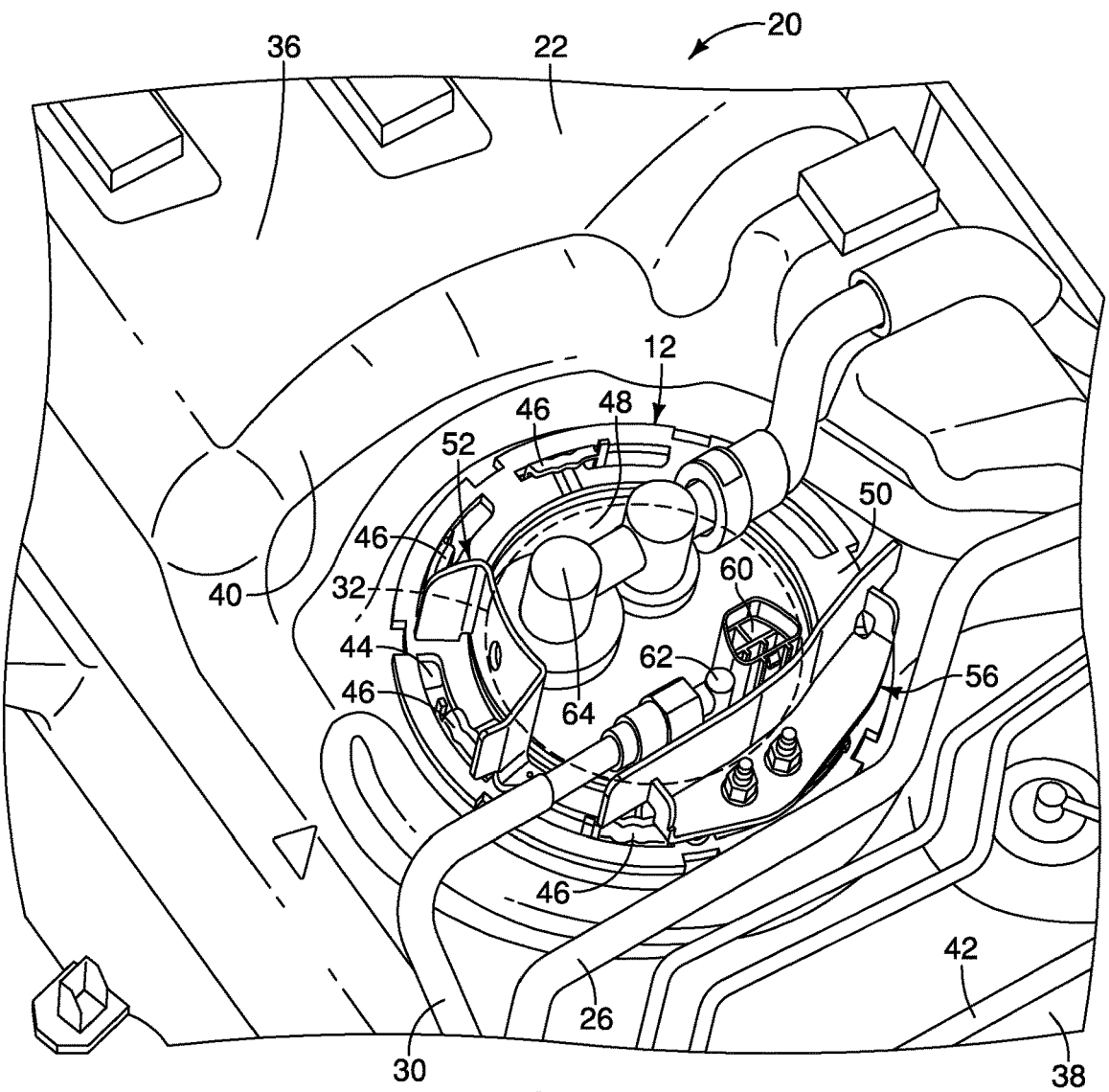
FIG. 3 is a perspective view of a central portion of the fuel tank with the fuel tank cover attachment assembly, showing a fuel pump cover, an attachment ring, a first flange member, an attachment bracket and a second flange member in accordance with the one embodiment.

As shown in FIG. 3, the fuel tank cover attachment assembly 12 includes a fuel pump cover 48, an attachment ring 50, a first flange member 52, an attachment bracket 54 and a second flange member 56. The fuel tank cover attachment assembly 12 is configured to attach, lock and retain the fuel pump cover 48 to the fuel tank 22.

The fuel pump cover 48 is a top plate of a fuel pump, or, alternatively is a cover attached to a fuel pump. The fuel pump cover 48 has a substantially circular shape.

As shown in FIGS. 3-10, an electrical connector 60 and a fuel out fitting 62 of the fuel pump are visible extending above the fuel pump cover 48. A vent tube 64 also extends through the fuel pump cover 48 and is connected to the vent line 24 in a conventional manner. The remainder of the fuel pump extends through the opening 32 and down into the fuel tank 22. The fuel pump extends to a location near or at the bottom of the interior of the fuel tank 22. The fuel pump is configured to pump fuel from within the fuel tank 22 out through the fuel out fitting 62 and through the fuel line 30 to the engine (not shown) of the vehicle body structure 10 in a conventional manner.

The electrical connector 60 is configured to attached to a wiring connector (not shown) that provides electric power to the fuel pump and can also include wiring that connects to a fuel level sensor (not shown) that can optionally be a part of the fuel pump. Since vent lines, fuel out fittings, electrical connectors of fuel pumps and fuel pumps are conventional features of a fuel tank, further description of the fuel pump is omitted for the sake of brevity.

The fuel pump cover 48 also includes an annular attachment flange 48a that is dimensioned, configured and shaped to overlay the surface 44 that surrounds the fuel tank opening 32. With the fuel pump cover 48 overlaying the surface 44, the fuel tank opening is covered.

As shown in FIGS. 3 and 6-10, the attachment ring 50 is dimensioned and shaped to cover the attachment flange 48a of the fuel pump cover 48, but, does not cover or extend over that portion of the fuel pump cover 48 surrounded by the attachment flange 48a. In other words, with the attachment ring 50 overlaying the attachment flange 48a of the fuel pump cover 48, the electrical connector 60, the fuel out fitting 62 and the vent tube 64 are exposed.

Figure 12:
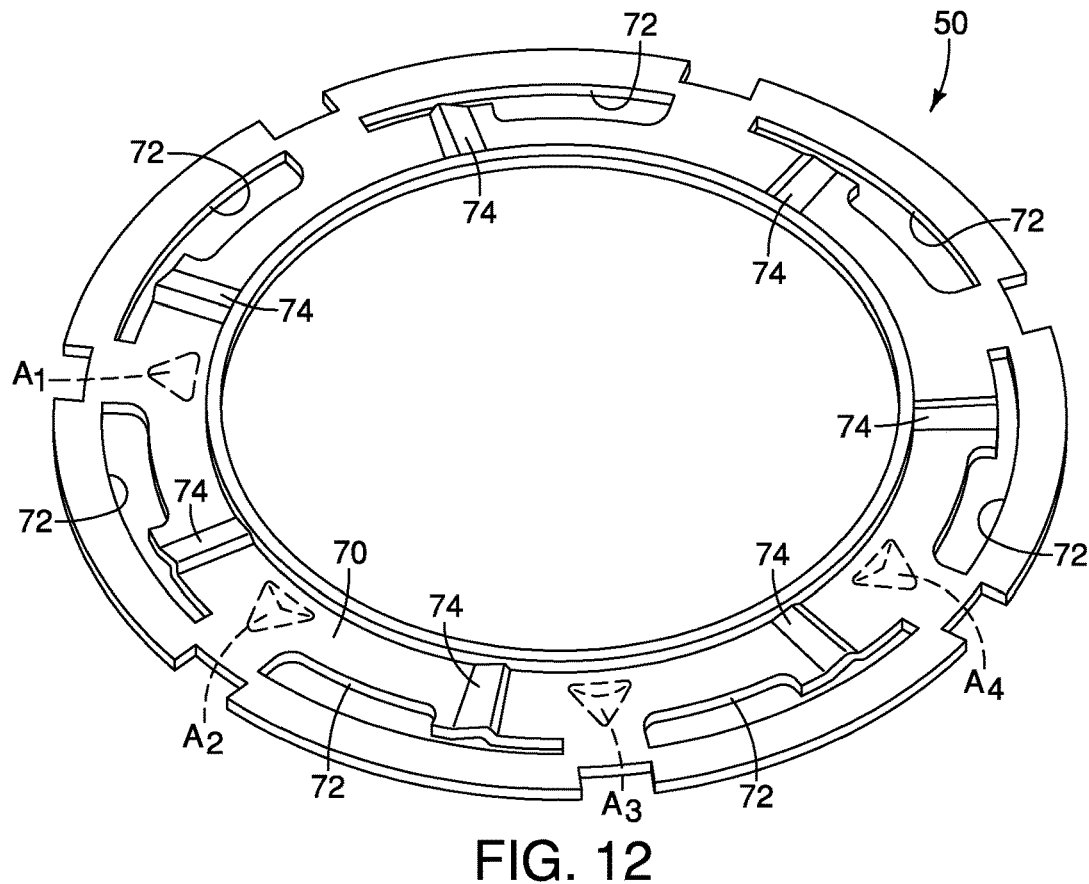
FIG. 12 is a perspective view of the attachment ring removed from the fuel tank prior to installation of the first flange member and the attachment bracket in accordance with the one embodiment.

The attachment ring 50 is configured to attach to the attachment features 46 that protrude upward from the surface 44, as is described further below. As shown in FIG. 12, the attachment ring 50 has an overall annular shape. The attachment ring 50 has an upper surface referred to herein as an annular surface 70 that extends parallel to the surface 44 that surrounds the fuel tank opening 32, with the attachment ring 50 attached to the fuel tank 22. The annular ring 50 has approximately the same annular shape and dimensions as the surface 44 of the fuel tank 22.

FIG. 12 shows the attachment ring 50 with the first flange member 52 and the attachment bracket 54 removed. As shown in FIG. 12, the attachment ring 50 includes a plurality of annularly spaced apart slots 72 that extend vertically through the attachment ring 50. The slots 72 are shaped and configured to receive corresponding ones of the attachment features 46 of the surface 44 of the fuel tank 22. The annular surface 70 further includes locking ridges 74 that engage the attachment features 46 locking the attachment ring 50 in position after the attachment ring 50 is installed to the fuel take 22.

Figure 5:
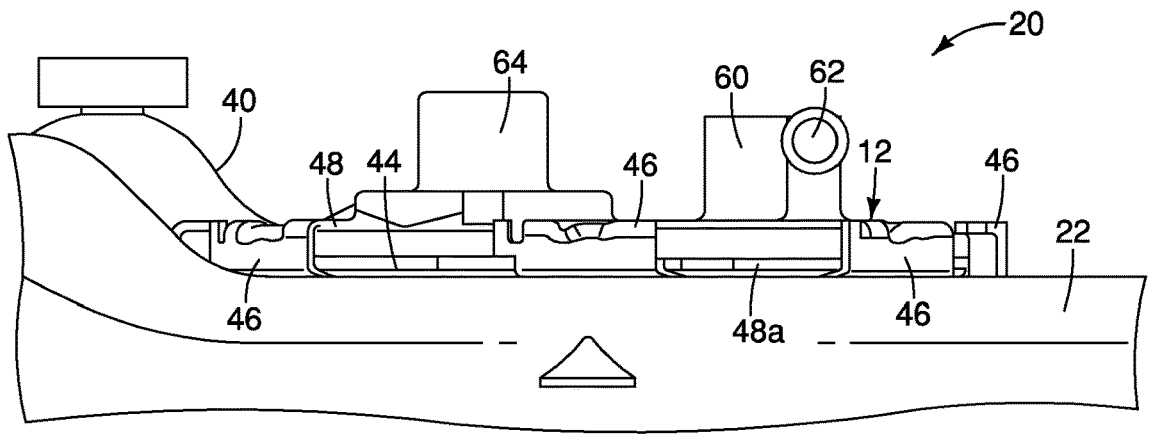
FIG. 5 is a front view of the central portion of the fuel tank showing the fuel pump cover in place over an opening in the fuel tank with the attachment ring, the first flange member, the attachment bracket and the second flange member removed in accordance with the one embodiment.

During installation, the fuel pump cover 48 is laid on top of the annular surface 44 of the fuel tank 22 covering the opening 32 of the fuel tank 22, as shown in FIG. 5. The fuel pump cover 50 has recesses corresponding to the locations of each of the plurality of attachment features 46 of the fuel tank 22 such that the plurality of attachment features 46 are radially outboard of the fuel pump cover 48. Next the attachment ring 50 is laid over the outer periphery of the fuel tank cover 48 such that the plurality of attachment features 46 extend through the slots 72. Thereafter the attachment ring 50 is rotated until the plurality of attachment features 46 engage and are locked in place by the locking ridges 74, as shown in FIGS. 6-11 and 18. The fuel tank cover 48 is sandwiched between the annular surface 44 of the fuel tank 22 and the attachment ring 50, thereby securing the fuel pump cover 48 and the fuel pump to the fuel tank 22.

Prior to installation of the attachment ring 50 to the fuel tank 22, the first flange member 52 and the attachment bracket 54 are welded to the attachment ring 50. Specifically as shown in FIG. 12, the first flange member 52 is welded to areas $A_1$ and $A_2$ of the annular surface 70 of the attachment ring 50, and, the attachment bracket 54 is attached is welded to areas $A_3$ and $A_4$ of the annular surface 70 of the attachment ring 50.

Figure 14:
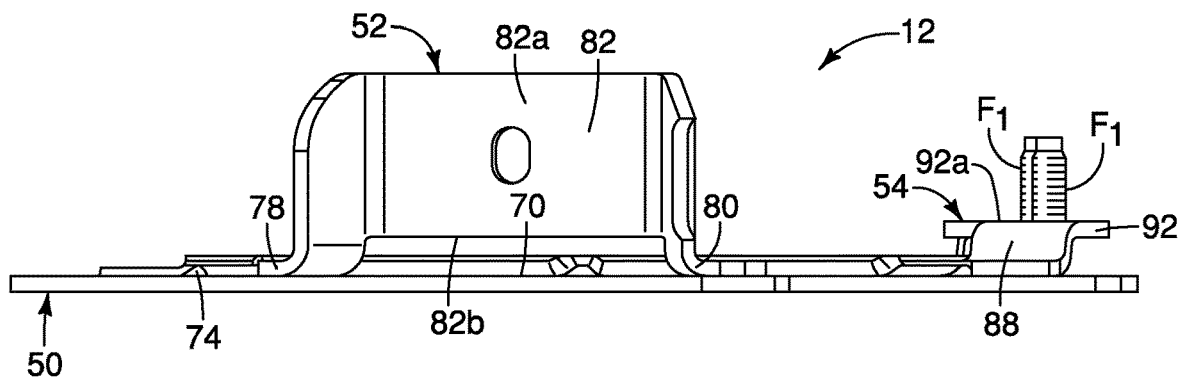
FIG. 14 is a rear view of attachment ring removed from the fuel tank showing the first flange member and the attachment bracket welded thereto in accordance with the one embodiment.

As shown in FIG. 14, the first flange member 52 has a first end flange 78, a second end flange 80 and a first main flange 82 that defines a first main surface 82a. The first main surface 82a extends between the first end flange 78 and the second end flange 80. The first end flange 78 and the second end flange 80 are shaped such that prior to welding to the areas $A_1$ and $A_2$, the first end flange 78 and the second end flange 80 are co-planar and parallel to the annular surface 70 of the attachment ring 50 and parallel to the annular surface 44 of the fuel tank 22.

The first main surface 82a of the first main flange 82 extends in directions that are perpendicular to the annular surface 70 of the attachment ring 50, perpendicular to the annular surface 44 of the fuel tank 22 and perpendicular to the first end flange 78 and the second end flange 80. The first end flange 78 is welded to the area $A_1$ of the annular surface 70 of the attachment ring 50 and the second end flange 80 is welded to the area $A_2$ of the annular surface 70 of the attachment ring 50, as shown in FIGS. 13 and 14.

Figure 6:
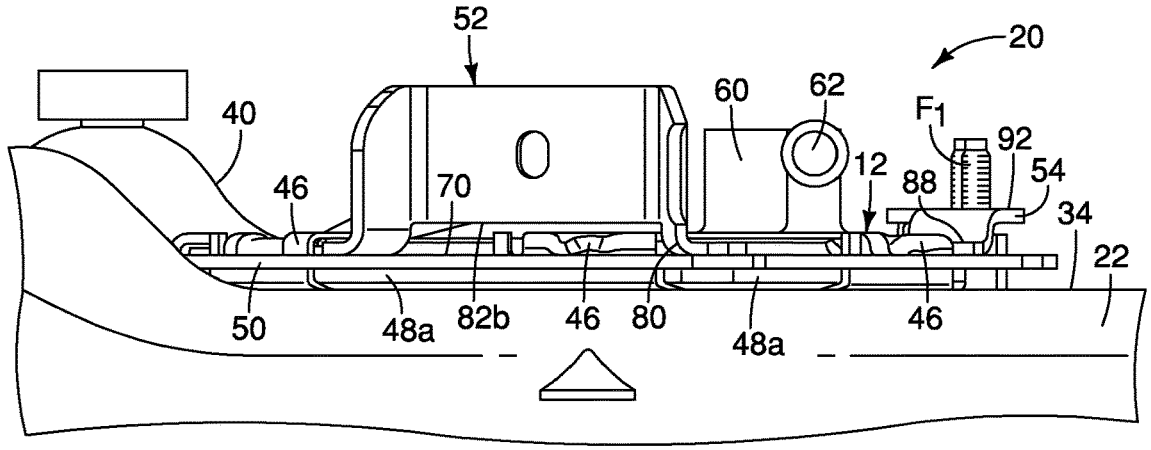
FIG. 6 is another front view of the central portion of the fuel tank similar to FIG. 5, showing the fuel pump cover fixed in place over the opening in the fuel tank by the attachment ring with the first flange member and the attachment bracket welded to the attachment ring, and, with the second flange member removed in accordance with the one embodiment.
Figure 7:
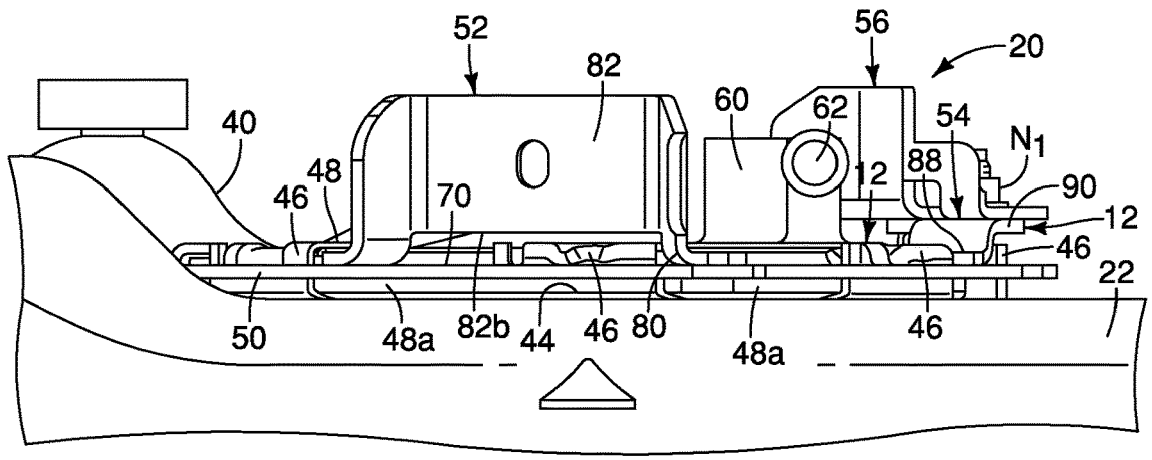
FIG. 7 is yet another front view of the central portion of the fuel tank similar to FIGS. 5 and 6, showing the fuel pump cover fixed in place over the opening in the fuel tank by the attachment ring with the first flange member and the attachment bracket welded to the attachment ring, and, with the second flange member attached to the attachment bracket via fasteners in accordance with the one embodiment.

As shown in FIGS. 6, 7 and 14, the first main flange 82 of first flange member 52 is shaped and configured such that a lower edge 82b of the first main flange 82 is spaced apart from the annular surface 70 of the attachment ring 50.

Figure 8:
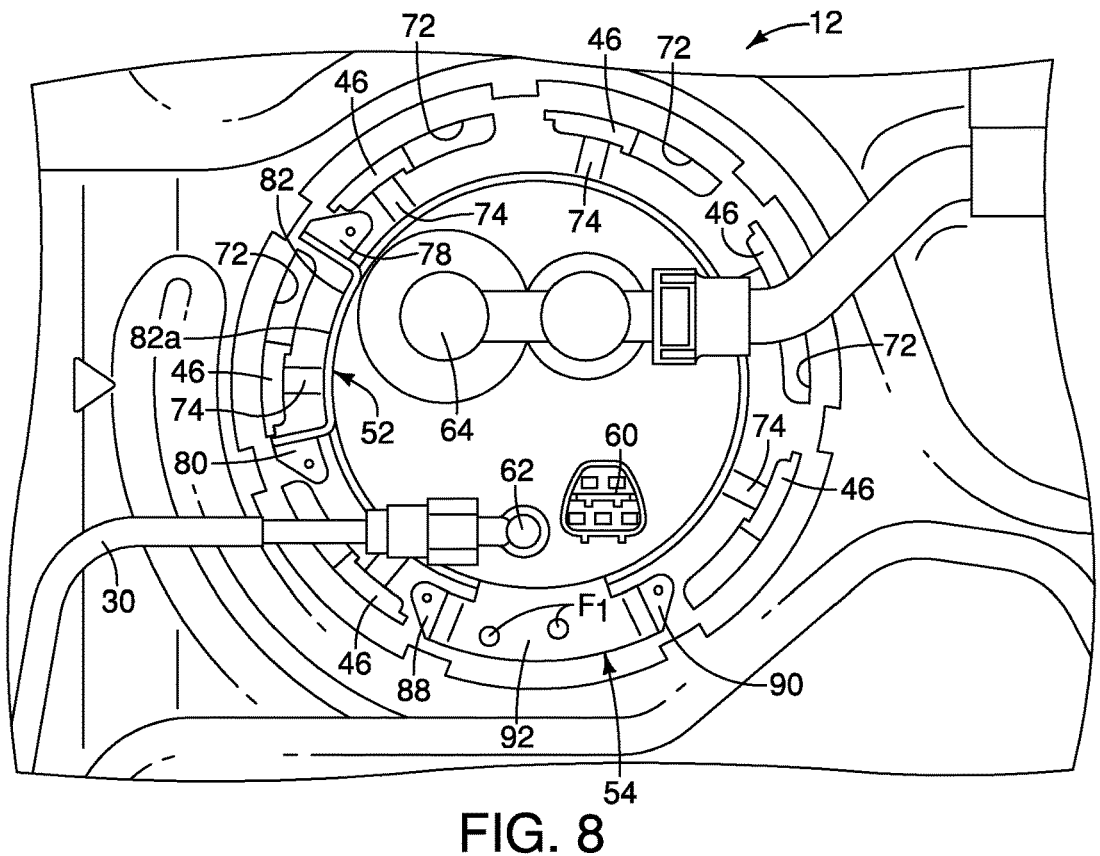
FIG. 8 is a top view of the central portion of the fuel tank showing the fuel pump cover fixed in place over the opening in the fuel tank by the attachment ring with the first flange member and the attachment bracket welded to the attachment ring, and, with the second flange member removed in accordance with the one embodiment.
Figure 9:
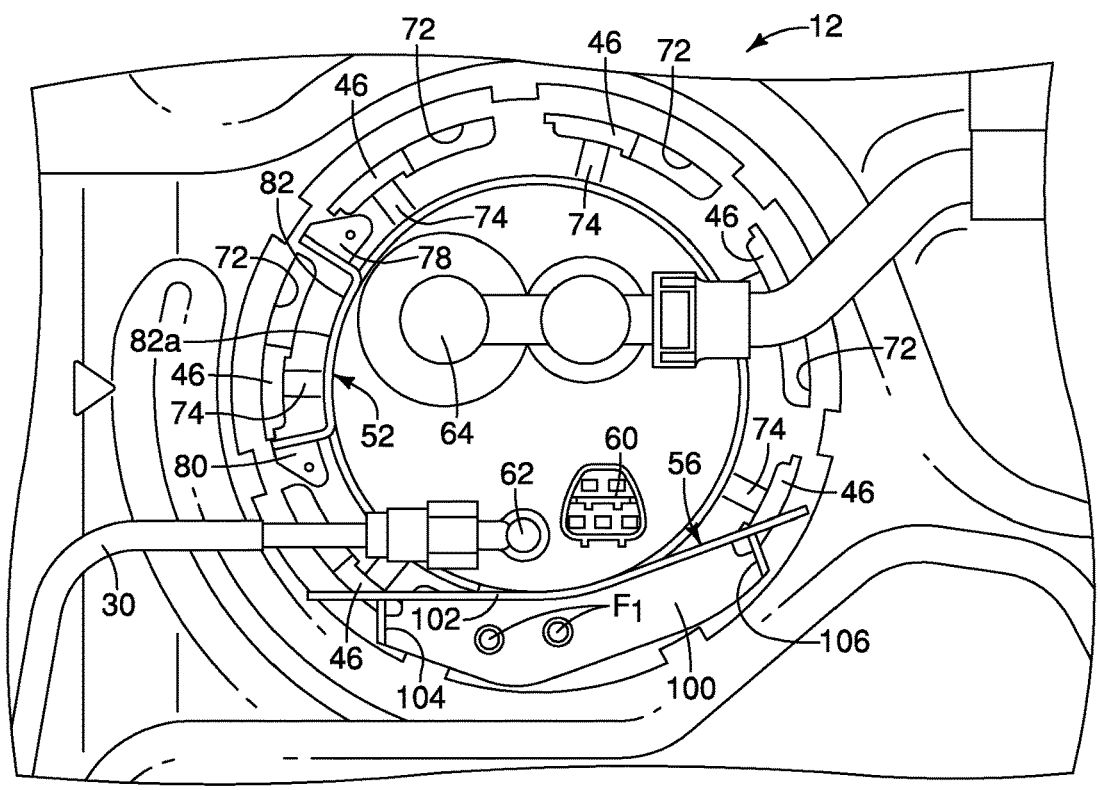
FIG. 9 is another top view of the central portion of the fuel tank similar to FIG. 8, showing the fuel pump cover fixed in place over the opening in the fuel tank by the attachment ring with the first flange member and the attachment bracket welded to the attachment ring, and, with the second flange member laid on top of the attachment bracket in accordance with the one embodiment.
Figure 10:
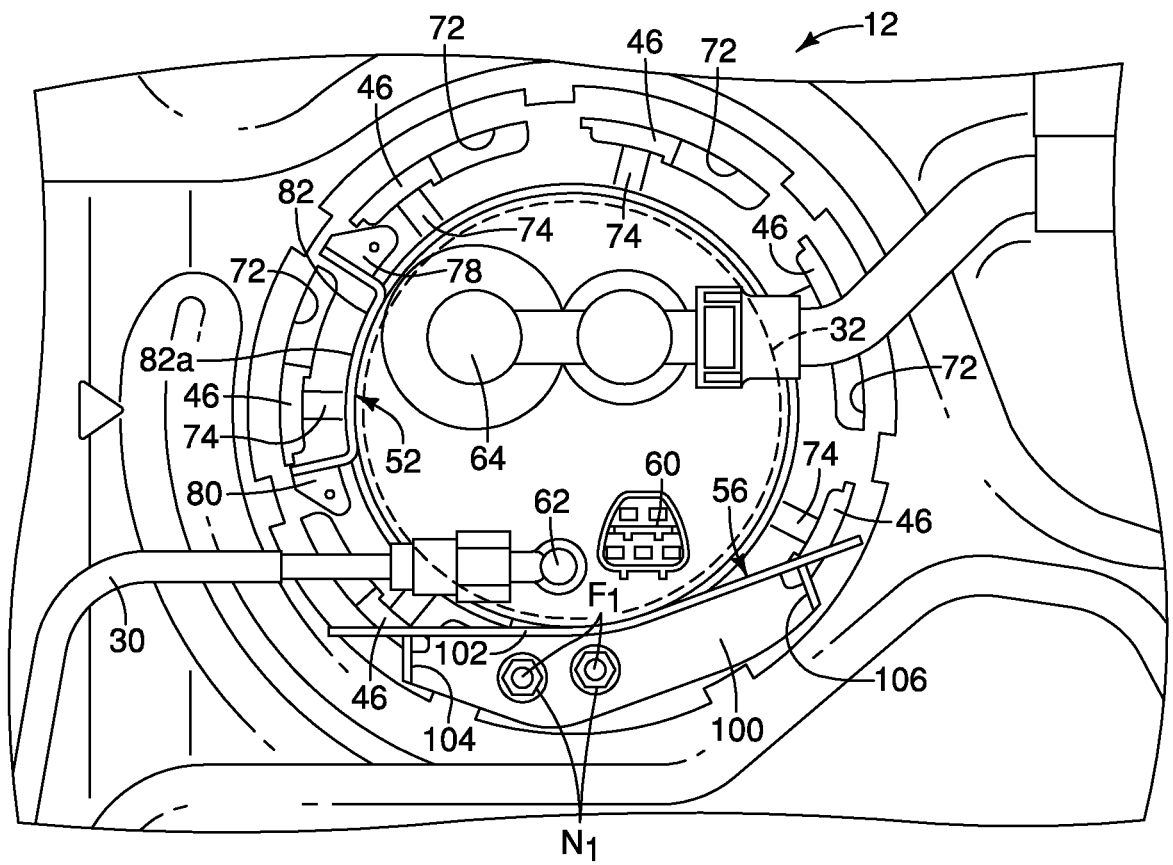
FIG. 10 is yet another top view of the central portion of the fuel tank similar to FIGS. 8 and 9, showing the fuel pump cover fixed in place over the opening in the fuel tank by the attachment ring with the first flange member and the attachment bracket welded to the attachment ring, and, with the second flange member fixed to top of the attachment bracket via mechanical fasteners in accordance with the one embodiment.
Figure 11:
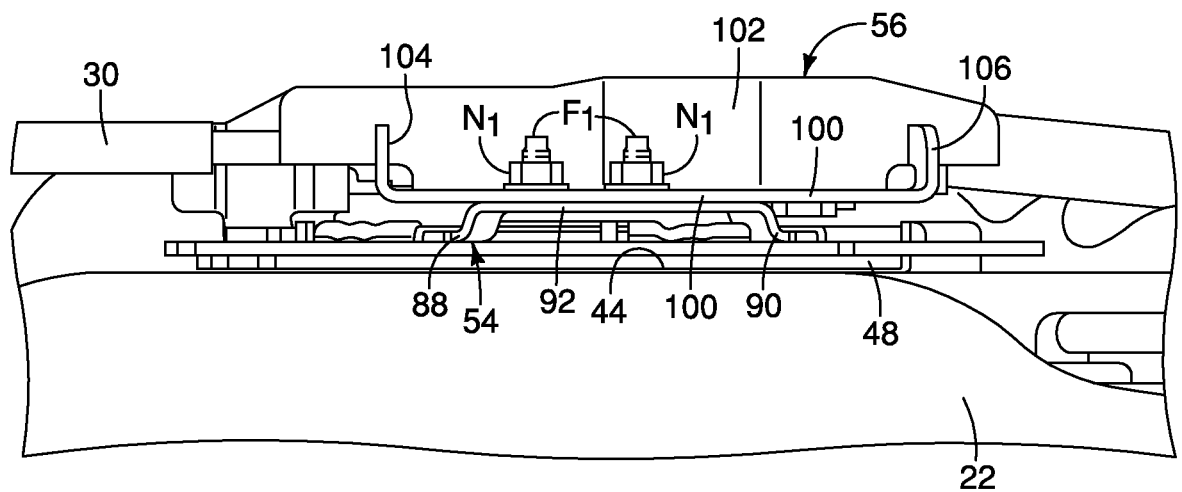
FIG. 11 is side of the central portion of the fuel tank showing the fuel pump cover fixed in place over the opening in the fuel tank by the attachment ring with the first flange member and the attachment bracket welded to the attachment ring, and, with the second flange member fixed to top of the attachment bracket via mechanical fasteners in accordance with the one embodiment.
Figure 13:
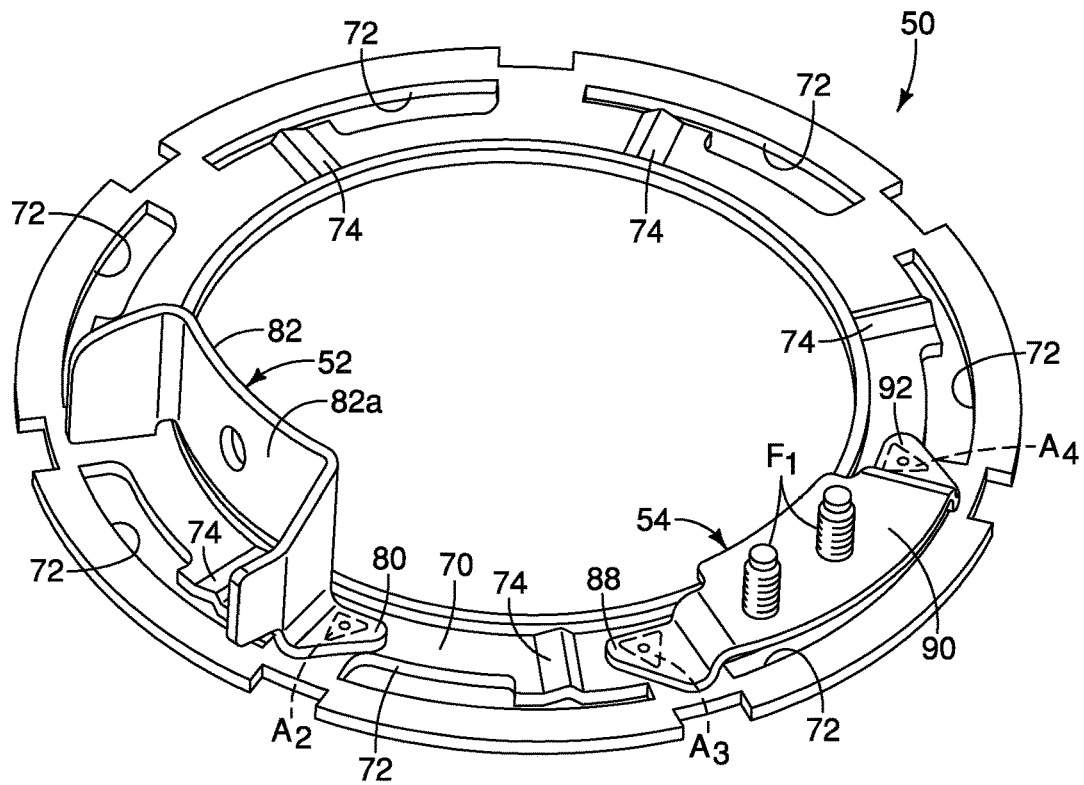
FIG. 13 is another perspective view of the attachment ring similar to FIG. 12 after installation and welding of the first flange member and the attachment bracket to predetermined locations on the attachment ring in accordance with the one embodiment.

As shown in FIGS. 8, 11 and 13, the attachment bracket 54 has a first end 88, a second end 90 and a supporting section 92 that defines an upper surface 92a. The first end 88 and the second end 90 are shaped such that prior to welding to the areas $A_3$ and $A_4$, the first end 88 and the second end 90 are co-planar and parallel to the annular surface 70 of the attachment ring 50 and parallel to the annular surface 44 of the fuel tank 22.

The upper surface 92a of the supporting section 92 extends in directions that are parallel to the annular surface 70 of the attachment ring 50, parallel to the annular surface 44 of the fuel tank 22 and parallel to the first end 88 and the second end 90. The first end 88 is welded to the area $A_3$ of the annular surface 70 of the attachment ring 50 and the second end 90 is welded to the area $A_4$ of the annular surface 70 of the attachment ring 50, as shown in FIGS. 13 and 14.

Figure 17:
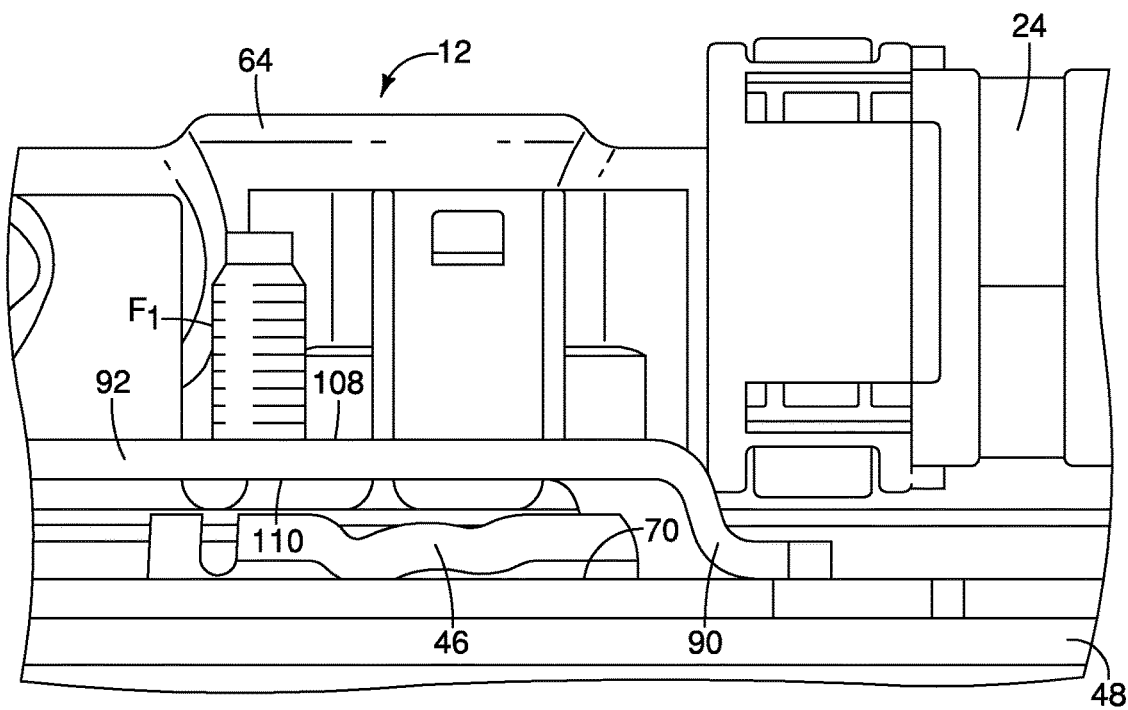
FIG. 17 is a side view of a portion of the central portion of the fuel tank showing the attachment bracket attached to the attachment ring in accordance with the one embodiment.
Figure 18:
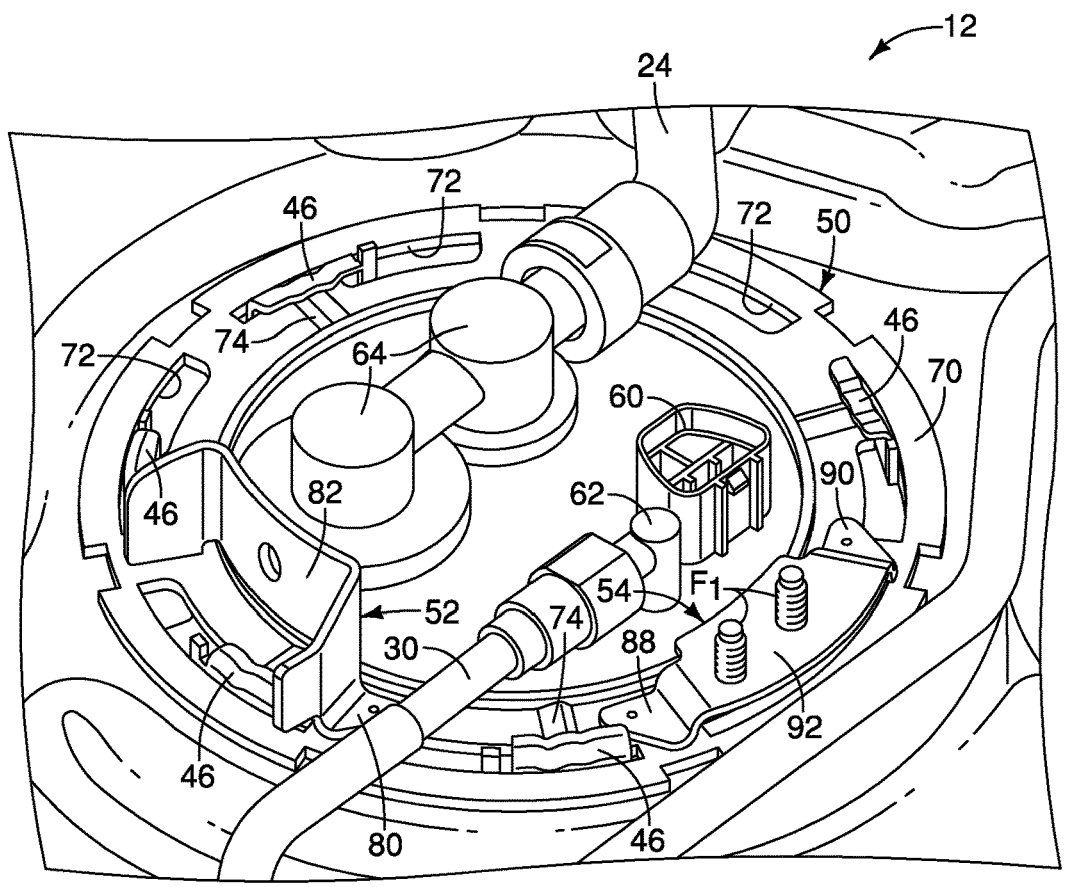
FIG. 18 is a perspective view of the portion of the central portion of the fuel tank depicted in FIG. 17 showing the first flange member and the attachment bracket attached to the attachment ring in accordance with the one embodiment.
Figure 19:
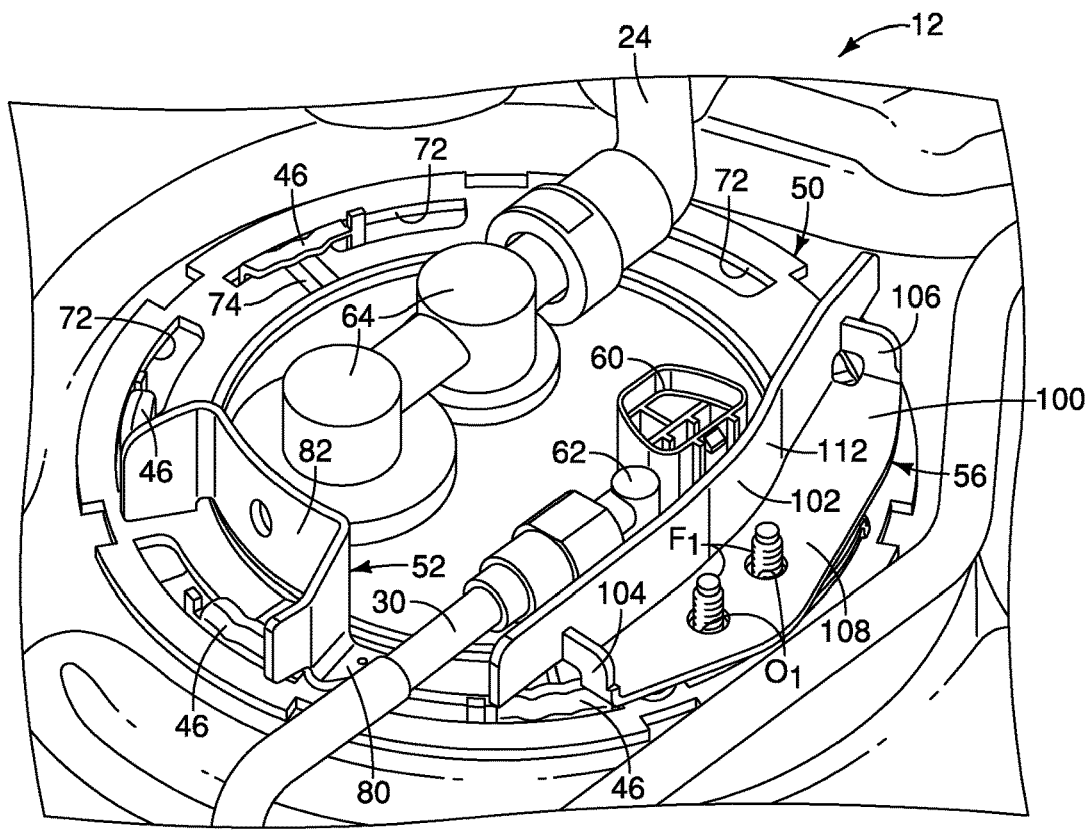
FIG. 19 is a perspective view of the portion of the central portion of the fuel tank similar to FIG. 18 showing the first flange member and the attachment bracket attached to the attachment ring with the second flange member overlaying the attachment bracket in accordance with the one embodiment.
Figure 20:
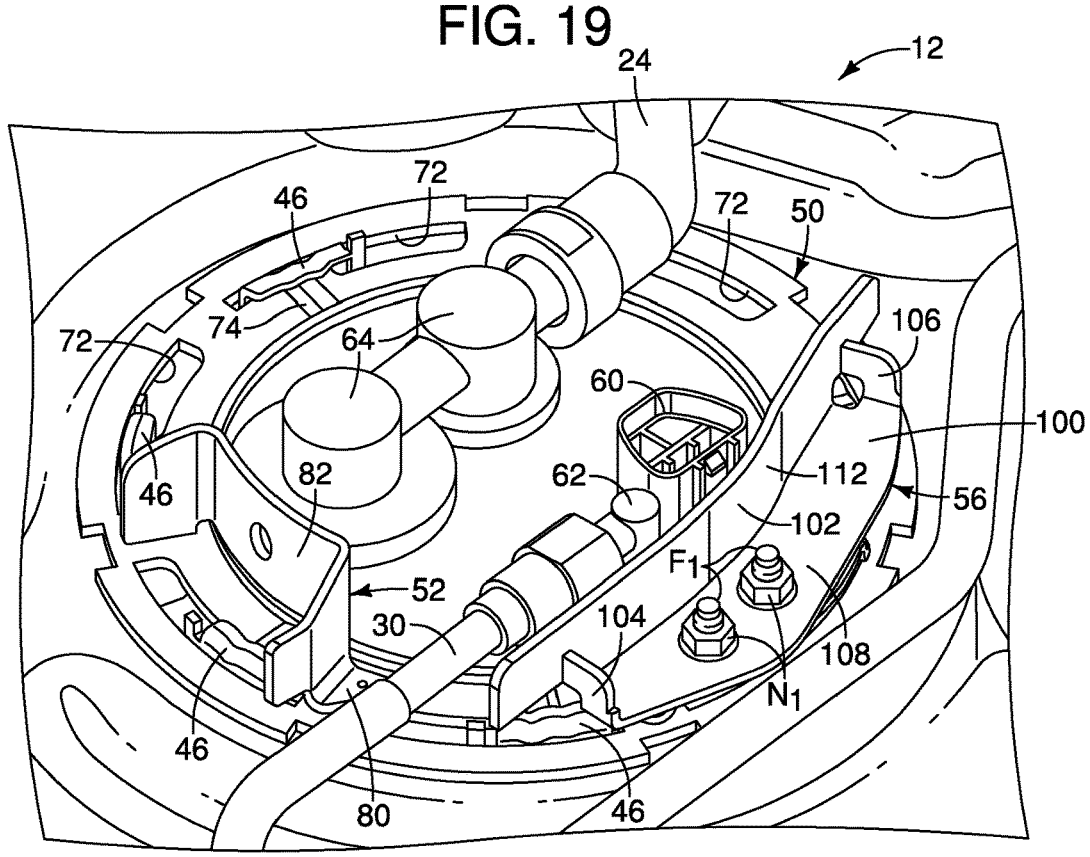
FIG. 20 is a perspective view of the portion of the central portion of the fuel tank similar to FIGS. 18 and 19 showing the first flange member and the attachment bracket attached to the attachment ring with the second flange member fixed to the attachment bracket via mechanical fasteners in accordance with the one embodiment.

As shown in FIGS. 11 and 17, the supporting section 92 of the attachment bracket 54 is spaced apart from the annular surface 70 of the attachment ring 50. Further, the supporting section 92 includes at least one mechanical fastener portion $F_1$ extending upwardly therefrom. In the depicted embodiment, the supporting section 92 includes two mechanical fastener portions $F_1$. In the depicted embodiment, the mechanical fastener portions $F_1$ are threaded studs that are welded to the supporting section 92 at spaced apart locations and extend upward.

As shown in FIGS. 3, 8-10 and 18-20, the second flange member 56 is removably attached to supporting section 92 of the attachment bracket 54 of the attachment ring 50. A portion of the second flange member 56 extends upwardly therefrom. The second flange member 56 is fixed to the attachment bracket 54 via nuts $N_1$ that are treaded on to the mechanical fastener portions $F_1$.

Figure 15:
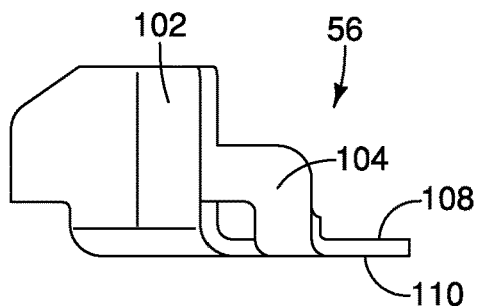
FIG. 15 is a rear view of the second flange member removed from the attachment ring in accordance with the one embodiment.
Figure 16:
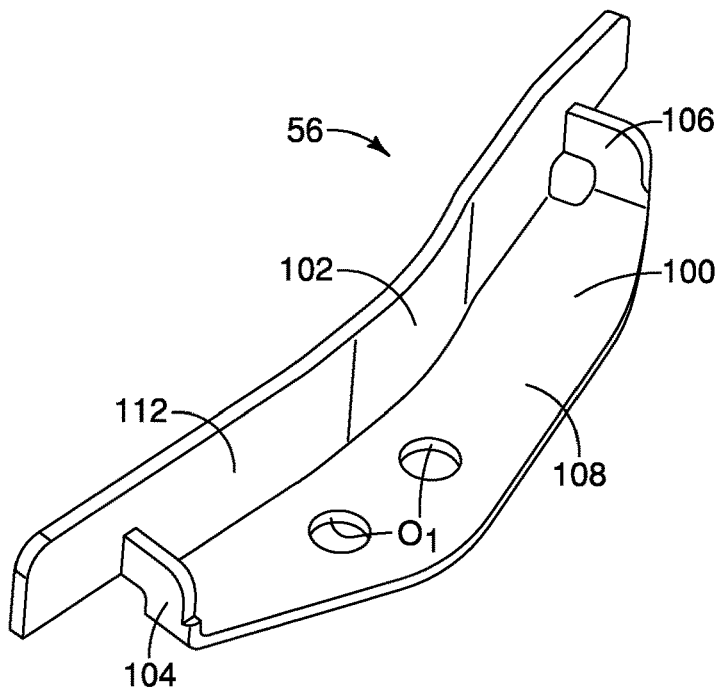
FIG. 16 is a perspective view of the second flange member removed from the attachment ring in accordance with the one embodiment.

The second flange member 56 is shown removed from the attachment ring 50 in FIGS. 15 and 16. The second flange member 56 is made of a single sheet metal material that is bent and shaped to include an attachment section 100, an upright section 102, a first end flange 104 and a second end flange 106. The attachment section 100 is defined between a first surface 108 (an upper surface) and a second surface 110 (a lower surface). The upright section 102 defines at least one upright surface 112. The first surface 108, the second surface 110 and the attachment section 100 are parallel to the annular surface 70 once installed to the supporting section 92 of the attachment bracket 54.

The upright surface 112 extends from the first surface 108 in an upward direction perpendicular to the first surface 108 and the annular surface 70. The attachment section 100 of the second flange member 56 includes at least one aperture $O_1$. In the depicted embodiment there are two apertures $O_1$. The second flange member 56 is removably coupled to the attachment ring 50 by the mechanical fasteners $F_1$ and the nuts $N_1$ threaded thereto. The mechanical fasteners $F_1$ extend through the apertures $O_1$.

Since the supporting section 92 of the attachment bracket 54 is spaced apart from the attachment ring 50 and the attachment section 100 is installed along the upper surface 92a of the supporting section 92, the attachment section of the second flange member 56 (as well as all other portions of the second flange member 56) has a non-contacting and spaced apart relationship with the annular surface 70.

With the attachment ring 50, with the first flange member 52 and attachment brackets 54 welded thereto, and the second flange member 56 fastened to the attachment bracket 54, the central area of the fuel tank 22 is protected from moisture and debris. The central are of the fuel tank 22 is further provided with layers of protection against deformation of the fuel pump cover 48 and fuel pump related features, such as the electrical connector 60, the fuel out fitting 62 and the vent tube 64.

Specifically, as shown in FIGS. 3 and 4, the central area of the fuel tank 22 where the fuel pump cover 48 is attached, first and second walls 40 and 42 protect lateral sides of the central area of the fuel tank 22. Further, the first flange member 52 and the second flange member 56 provide forward and a lateral side of the central area of the fuel tank 22 with protection.

For example, the first flange member 52 includes the first main flange 82 that extends upward away from an area forward of the fuel pump cover 48. The first main flange 52 is spaced apart from the attachment ring 50 such that in the event of contact with debris or deformation related to an impact event, the fuel pump cover 48 is provided with protection forward thereof. The first main flange 52 can undergo a predetermined amount of deformation without contacting the electrical connector 60, the fuel out fitting 62 and/or the vent tube 64.

The wall 40 of the fuel tank 22 provides similar protection from a first lateral side thereof. The wall 42 also provides some protection from a second lateral side thereof. The wall 42 is farther away from the fuel tank cover attachment assembly 12 than the first wall 40.

The second flange member 56 provides protection that compliments the protection provided by the second wall 42. Specifically, the second flange member 56 includes the upright section 102 that extends upward away from a lateral side of the fuel pump cover 48. The second main flange 56 is spaced apart from the attachment ring 50 such that in the event of contact with debris or deformation related to an impact event, the fuel pump cover 48 is provided with lateral protection. The second main flange 56 can undergo a predetermined amount of deformation without contacting the electrical connector 60, the fuel out fitting 62 and/or the vent tube 64.

The various vehicle features and vehicle structural features shown in, for example, FIG. 1 are conventional components that are well known in the art. Since vehicle features and structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the fuel tank cover attachment assembly. Accordingly, these terms, as utilized to describe the present invention should be interpreted relative to a vehicle equipped with the fuel tank cover attachment assembly.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A fuel tank cover attachment assembly comprising:
    a fuel pump cover having an attachment flange configured to overlay a surface surrounding a fuel tank opening such that with the fuel pump cover overlaying the surface, the fuel tank opening is covered; and
    an attachment ring dimensioned to cover the attachment flange of the fuel pump cover and attach to attachment features protruding from the surface, the attachment ring having a first flange member and an attachment bracket with a second flange member, the first flange member being fixedly attached to the attachment ring and extending upwardly therefrom, the attachment bracket being directly attached to the attachment ring with the second flange member extending upwardly from the attachment bracket, the second flange member being directly removably attached to the attachment bracket.

2. The fuel tank cover attachment assembly according to claim 1, wherein
    the attachment ring has an annular surface that extends parallel to the surface surrounding the fuel tank opening, the first flange member having a first main surface that extends perpendicular to the annular surface.

3. The fuel tank cover attachment assembly according to claim 2, wherein
    the first flange member has a first end flange and a second end flange with the first main surface extending therebetween, the first end flange and the second end flange being welded to the annular surface of the attachment ring.

4. The fuel tank cover attachment assembly according to claim 3, wherein
    the first flange member is shaped and configured such that a lower edge of the first flange member is spaced apart from the annular surface.

5. The fuel tank cover attachment assembly according to claim 1, wherein
    the attachment ring has an annular surface that extends parallel to the surface surrounding the fuel tank opening, and
    the second flange member has a first surface, a second surface and an upright surface, the first surface and second surface defining an attachment section therebetween, the first and second surface being parallel to the annular surface, and, the upright surface extends from the second surface in an upward direction that is perpendicular to the annular surface.

6. The fuel tank cover attachment assembly according to claim 5, wherein
    the attachment section of the second flange member includes at least one aperture with the second flange member being removably coupled to the attachment ring by at least one mechanical fastener that extend through the at least one aperture.

7. The fuel tank cover attachment assembly according to claim 6, wherein
    the attachment section of the second flange member has a non-contacting and spaced apart relationship with the annular surface.

8. The fuel tank cover attachment assembly according to claim 1, wherein
the fuel pump cover has a substantially circular shape.

9. The fuel tank cover attachment assembly according to claim 1, further comprising
a fuel pump attached to the fuel pump cover.

10. The fuel tank cover attachment assembly according to claim 9, wherein
the attachment ring includes a plurality of annularly spaced apart slots configured to receive corresponding ones of the attachment features.

11. The fuel tank cover attachment assembly according to claim 1, wherein
the attachment bracket has a first end, a second end and a supporting section that extends from the first end to the second end, the first end and the second end being fixedly attached to the annular surface of the attachment ring at spaced apart locations, and the supporting section being spaced apart from and above the annular surface of the attachment ring.

12. The fuel tank cover attachment assembly according to claim 11, wherein
the second flange member is removably attached to the attachment bracket via mechanical fasteners.

13. A fuel tank cover attachment assembly comprising:
a fuel pump cover having an attachment flange configured to overlay a surface surrounding a fuel tank opening such that with the fuel pump cover overlaying the surface, the fuel tank opening is covered; and
an attachment ring dimensioned to cover the attachment flange of the fuel pump cover and attach to attachment features protruding from the surface, the attachment ring having a first flange member a second flange member, the first flange member being fixedly attached to the attachment ring and extending upwardly therefrom, and, the second flange member being removably attached to the attachment ring and extending upwardly therefrom, the attachment ring having an annular surface that extends parallel to the surface surrounding the fuel tank opening, the first flange member having a first main surface that extends perpendicular to the annular surface, and, the first flange member being shaped and configured such that a lower edge of the first flange member is spaced apart from the annular surface.

14. The fuel tank cover attachment assembly according to claim 13, further comprising:
an attachment bracket having a first end, a second end and a supporting section that extends from the first end to the second end, the first end and the second end being fixedly attached to the annular surface of the attachment ring at spaced apart locations, and the supporting section being spaced apart from and above the annular surface of the attachment ring with the second flange member being removably attached to the attachment bracket.

15. The fuel tank cover attachment assembly according to claim 14, wherein
the second flange member is removably attached to the attachment bracket via mechanical fasteners.

16. A fuel tank cover attachment assembly comprising
a fuel pump cover having an attachment flange configured to overlay a surface surrounding a fuel tank opening such that with the fuel pump cover overlaying the surface, the fuel tank opening is covered;
an attachment ring dimensioned to cover the attachment flange of the fuel pump cover and attach to attachment features protruding from the surface, the attachment ring having a first flange member a second flange member, the first flange member being fixedly attached to the attachment ring and extending upwardly therefrom, and, the second flange member being removably attached to the attachment ring and extending upwardly therefrom, the attachment ring having an annular surface that extends parallel to the surface surrounding the fuel tank opening, and the second flange member has a first surface, a second surface and an upright surface, the first surface and second surface defining an attachment section therebetween, the first and second surface being parallel to the annular surface, and, the upright surface extending from the second surface in an upward direction that is perpendicular to the annular surface, and
an attachment bracket having a first end, a second end and a supporting section that extends from the first end to the second end, the first end and the second end being fixedly attached to the annular surface of the attachment ring at spaced apart locations, and the supporting section being spaced apart from and above the annular surface of the attachment ring.

17. The fuel tank cover attachment assembly according to claim 16, wherein
supporting section includes at least one mechanical fastener portion extending upwardly therefrom.

18. The fuel tank cover attachment assembly according to claim 17, wherein
the second flange member has a first surface, a second surface and an upright surface, the first surface and second surface defining an attachment section therebetween, the first and second surface being parallel to the annular surface, and, the upright surface extends from the second surface in an upward direction that is perpendicular to the annular surface.

19. The fuel tank cover attachment assembly according to claim 18, wherein
the attachment section of the second flange member includes at least one aperture with the at least one mechanical fastener extending through the at least one aperture.

20. The fuel tank cover attachment assembly according to claim 19, wherein
the attachment section of the second flange member has a non-contacting and spaced apart relationship with the annular surface.

\* \* \* \* \*